United States Patent Office.

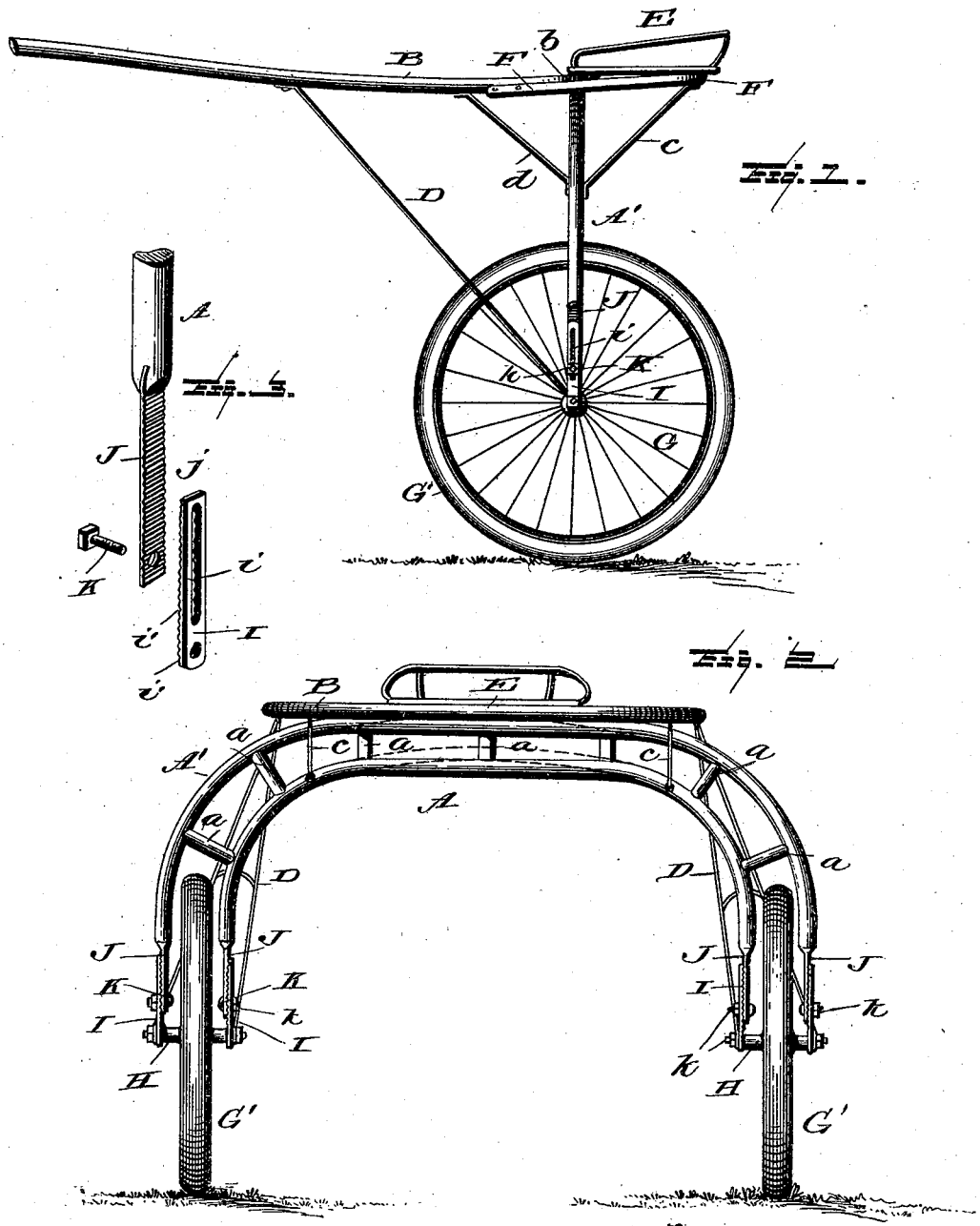

WILLIAM JOHN HAMILL, OF ST. CATHARINES, CANADA.

SULKY.

SPECIFICATION forming part of Letters Patent No. 503,137, dated August 15, 1893.

Application filed April 22, 1893. Serial No. 471,379. (No model.)

*To all whom it may concern:*

Be it known that I, WILLIAM JOHN HAMILL, a subject of the Queen of Great Britain, residing at St. Catharines, Province of Ontario, Dominion of Canada, have invented certain new and useful Improvements in Sulkies, of which the following is a specification, reference being had therein to the accompanying drawings.

This invention relates to certain new and useful improvements in sulkies of that class in which the wheels are of small diameter and are of the cushion or pneumatic tire type.

It has for its objects among others to provide a simple, light, cheap and inexpensive sulky of this character in which provision is made for the adjustment of the axle according to the size of the horse to be used in connection therewith. The axle is a curved or arched one formed of two substantially like parts suitably braced and supporting the seat and thills and having at their lower ends adjustable bearings for the spindles or shafts upon which the wheels are carried.

Other objects and advantages of the invention will hereinafter appear and the novel features thereof will be specifically defined by the appended claims.

The invention is clearly illustrated in the accompanying drawings, which, with the letters of reference marked thereon, form a part of this specification, and in which—

Figure 1 is a side elevation of my improved sulky. Fig. 2 is a rear view thereof. Fig. 3 is a perspective view of the adjustable plates and their connecting means at the lower end of the axle, on an enlarged scale, and Fig. 4 is a detail showing the bend of the shafts.

Like letters of reference indicate like parts throughout the several views.

Referring now to the details of the drawings by letter, A designates one part and A' the other part of my axle; they are alike in all essentials and each is curved or arched as seen best in Fig. 2, the two being suitably braced as by the short brace bars or arms $a$ as seen in Fig. 2. The top portions of these two parts are somewhat flattened as seen in Fig. 2 to form a better and firmer support for the shafts.

The shafts B are formed preferably of one piece bent into the desired shape and bent upward at the rear as seen at $b^x$, Fig. 4, to receive the seat with the rear curved portion $b$ resting upon the flattened portion of the axle and braced by the inclined braces $c$ at the rear and by the short braces $d$ and the longer braces D in front as seen in Figs. 1 and 2. The longer braces D extend from the spindles of the wheels as shown so as to better brace the parts.

E is the seat; it may be of any well known or preferred form, and it is supported upon the rear curved portion of the shafts and upon the rear curved bar F which is secured to the rear curved portion of the shafts and is braced by the rear short braces $c$ as seen in Fig. 1.

G are wheels of small diameter, preferably provided with pneumatic tires G' and with the spindles H with the outer ends of which the braces D are connected as above described. On each spindle, near the outer and inner ends, and held thereto in any suitable manner, are the vertical metallic arms I, provided with the elongated slots $i$ and upon one face provided with transverse grooves or ribs $i'$ as seen in Fig. 3 to form sort of ratchet teeth with which engage like grooves or teeth $j$ on the metallic arms J which are secured to the lower ends of the two parts of the axle as seen best in Fig. 3. A bolt or set screw K is provided which is held in the arm J and passing through the slot in the arm I receives a nut $k$ as seen in Figs. 1 and 2 to clamp and bind the parts together. By this means I provide a simple yet efficient means for easily and quickly adjusting the height of the axle as may be desired, without materially increasing the weight of the sulky.

What I claim as new is—

1. The combination with a sulky axle of two like arched parts, of toothed arms carried by the lower ends of said parts, the spindles, the toothed and slotted arms carried thereby, and the binding means for said arms, as set forth.

2. The improved sulky described, composed of an arched axle of two parts connected by transverse braces, the toothed metallic arms supported by the lower ends of the two parts of the axle, the shafts supported on the axle, the seat, the braces, the wheels and their spindles, the toothed and slotted arms on the spindles, and the binding means held in one set of said arms and passed through the slots of the other set and provided with nuts, substantially as shown and described.

In testimony whereof I affix my signature in presence of two witnesses.

WILLIAM JOHN HAMILL.

Witnesses:
W. B. GILLELAND,
J. E. DIXON.